(12) United States Patent
Watson et al.

(10) Patent No.: US 7,611,668 B2
(45) Date of Patent: Nov. 3, 2009

(54) MARKER PAINT

(75) Inventors: Hugh M. L. Watson, Derby (GB); Elaine C. Hodgkinson, Derby (GB)

(73) Assignee: Rolls-Royce PLC, London (GB)

( * ) Notice: Subject to any disclaimer, the term of this patent is extended or adjusted under 35 U.S.C. 154(b) by 0 days.

(21) Appl. No.: 12/213,844

(22) Filed: Jun. 25, 2008

(65) Prior Publication Data

US 2008/0264294 A1 Oct. 30, 2008

Related U.S. Application Data

(62) Division of application No. 10/760,529, filed on Jan. 21, 2004, now Pat. No. 7,404,925.

(30) Foreign Application Priority Data

Feb. 14, 2003 (GB) ................. 0303510.2

(51) Int. Cl.
  *G01N 31/22* (2006.01)
(52) U.S. Cl. .................................... 422/56
(58) Field of Classification Search ............ 422/56
  See application file for complete search history.

(56) References Cited

U.S. PATENT DOCUMENTS

| | | | |
|---|---|---|---|
| 3,839,898 A | 10/1974 | Talboom, Jr. et al. | |
| 4,131,593 A | 12/1978 | Mar et al. | |
| 4,311,623 A | 1/1982 | Supcoe | |
| 4,739,115 A | 4/1988 | Byrd et al. | |
| 5,008,136 A | 4/1991 | Chamberlain | |
| 5,137,575 A * | 8/1992 | Yasuki et al. | 106/441 |
| 5,580,172 A | 12/1996 | Bhardwaj et al. | |
| 5,650,461 A | 7/1997 | Wasserman et al. | |
| 5,759,256 A | 6/1998 | Stramel | |
| 5,907,008 A | 5/1999 | Nakano et al. | |
| 6,048,910 A | 4/2000 | Furuya et al. | |
| 6,434,267 B1 | 8/2002 | Smith | |

FOREIGN PATENT DOCUMENTS

| | | |
|---|---|---|
| EP | 0 707 203 A1 | 4/1996 |
| EP | 0 947 813 A1 | 10/1999 |
| EP | 1 288 266 A1 | 3/2003 |
| EP | 1 288 267 A1 | 3/2003 |

(Continued)

OTHER PUBLICATIONS http://www.web.archive.org for information on Sony XC-77 Monochrome camera.

*Primary Examiner*—Walter D Griffin
*Assistant Examiner*—Bobby Ramdhanie
(74) *Attorney, Agent, or Firm*—Oliff & Berridge, PLC

(57) ABSTRACT

A marker paint comprises 42 wt % to 52 wt % pigment, 31 wt % to 37 wt % acrylic resin and 17 wt % to 21 wt % silicone resin excluding solvent. The pigment comprises cobalt titanium oxide, titanium nickel antimony oxide, cobalt aluminum oxide or cadmium sulphide selenium to give a green, yellow, blue or red color respectively. The marker paint is used in conjunction with an irreversible temperature indicating paint to determine if there is any debris and/or dirt on the irreversible temperature indicating paint to affect the accuracy of the temperature measurement of the irreversible temperature indicating paint.

10 Claims, 1 Drawing Sheet

FOREIGN PATENT DOCUMENTS

| | | |
|---|---|---|
| EP | 1 291 393 A1 | 3/2003 |
| EP | 1 291 394 A1 | 3/2003 |
| EP | 1 291 395 A1 | 3/2003 |
| EP | 1 335 004 A1 | 8/2003 |
| GB | 1103059 | 2/1968 |
| GB | 1214361 A | 12/1970 |
| GB | 2 204 874 A | 11/1988 |
| GB | 2 328 213 A | 2/1999 |
| JP | A-61-258871 | 11/1986 |
| JP | A-10-195332 | 7/1998 |

\* cited by examiner

MARKER PAINT

This is a Division of application Ser. No. 10/760,529 filed Jan. 21, 2004. The disclosure of the prior application is hereby incorporated by reference herein in its entirety.

The present invention relates to a method of analysing a temperature indicating paint using a marker paint.

Irreversible temperature indicating paints are used in the development of gas turbine engines. The irreversible temperature indicating paints are applied to components of gas turbine engines and the gas turbine engine is run at the gas turbine engines normal operating conditions. The irreversible temperature indicating paint changes colour at one or more known temperatures. These colour changes of the temperature indicating paint indicate the temperature to which different parts of a component or components have been subjected. Temperature indicating paints thus produce a temperature profile over the whole surface of a component rather than discrete points, if for example thermocouples are used.

One known temperature indicating paint described in our UK patent GB1103059 comprises principally lead chromate, magnesium carbonate and silica.

Another known temperature indicating paint described in our UK patent GB2204874 comprises one or more of silver, gold, platinum, palladium, copper, nickel, chromium, titanium and silicon dispersed in 10 to 70 wt % solvent and resin.

Conventionally the components are removed from the gas turbine engine and the colour changes of the irreversible temperature indicating paint are interpreted in a laboratory.

It is also known from our published European patent application EP0947813A1 to use a boroscope and a digital CCD camera to obtain an image of the irreversible temperature indicating paint while the components are in the gas turbine engine. The use of a boroscope to obtain an image of the irreversible temperature indicating paint enables the irreversible temperature indicating paint to be analysed without removing the components from the gas turbine engine.

However, the use of a boroscope to obtain an image of and to analyse the irreversible temperature indicating paint has some problems. Firstly it is difficult to obtain the right balance of light for illumination of the irreversible temperature indicating paint to achieve a suitable colour balance. Secondly when the gas turbine engine is run at normal operating conditions debris and/or dirt may be deposited on the irreversible temperature indicating paint masking the colour of the irreversible temperature indicating paint. Both these effects make it difficult to analyse the irreversible temperature indicating paint and/or reduce the accuracy of the temperature measurement. It has not been possible to determine the amount of debris and/or dirt deposited on the irreversible temperature indicating paint.

Accordingly the present invention seeks to provide a novel marker paint, which is capable of withstanding a temperature up to at least 1100° C. and the marker paint does not change colour.

Accordingly the present invention also seeks to provide a novel method of analysing an irreversible temperature indicating paint using a marker paint to provide improved temperature resolution.

Accordingly the present invention provides a marker paint comprising a pigment, a binder and a solvent, the pigment comprising cobalt titanium oxide, titanium nickel antimony oxide, cobalt aluminium oxide or cadmium sulphide selenium.

Preferably the marker paint broadly comprises 42 wt % to 52 wt % pigment, 31 wt % to 37 wt % acrylic resin and 17 wt % to 21 wt % silicone resin excluding solvent.

More preferably the marker paint comprises 45 wt % to 49 wt % pigment, 32.5 wt % to 35.5 wt % acrylic resin and 18 wt % to 20 wt % silicone resin excluding solvent.

A particular marker paint comprises 47 wt % pigment, 34 wt % acrylic resin and 19 wt % silicone resin excluding solvent.

Preferably the binder comprises acrylic resin and silicone resin.

Preferably the acrylic resin comprises polybutyl methacrylate.

Preferably the silicone resin comprises a high temperature silicone resin.

Preferably the solvent comprises a mixture of propylene glycol ethers. Preferably the solvent comprises a mixture of 80% 1-methoxy-2-propanol and 20% dipropylene glycol monomethyl ether.

The present invention also provides a method of analysing a temperature indicating paint using a marker paint comprising applying an irreversible temperature indicating paint to a component of a machine, applying a marker paint to the component of the machine, the irreversible temperature indicating paint having one or more changes of colour at one or more known temperatures, these color changes of the irreversible temperature indicating paint indicate the temperature to which different parts of the component have been subjected, the marker paint does not change colour, operating the machine for a predetermined period of time such that the component of the machine reaches its operating conditions, viewing the irreversible temperature indicating temperature paint and the marker paint on the component to produce an image of the component, analysing the image of the component to determine if any debris and/or dirt has deposited on the marker paint and to determine the amount of debris and/or dirt and analysing the image of the irreversible temperature indicating paint to determine the temperature at different regions of the component taking into account the amount of any debris and/or dirt deposited onto the marker paint.

Preferably the method comprises analyzing that part of the image corresponding to the irreversible temperature indicating paint and determining the colours of the irreversible temperature indicating paint at different positions, allocating temperatures to the colours at the different positions from a store of the known colours for that particular irreversible temperature indicating paint.

Preferably the method comprises analyzing the colour of that part of the image corresponding to the marker paint by comparing the colour of that part of the image corresponding to the marker paint with a stored colour of the marker paint to determine if there is a difference in colour.

Preferably the method comprises adjusting the temperature allocated to the different positions on the irreversible temperature indicating paint.

Preferably the method comprises viewing the component using a boroscope.

Preferably the method comprises viewing the component using a camera.

Preferably the camera is a digital camera.

Preferably the camera is a CCD camera.

Preferably the method comprises applying a plurality of irreversible temperature indicating paints to the component, each irreversible temperature indicating paint having changes of colour at different temperatures to each of the other irreversible temperature indicating paints.

Preferably the method comprises applying a plurality of marker paints, each marker paint having a different colour to each of the other marker paints.

Preferably the machine is a gas turbine engine.

Preferably the component is a turbine blade or a turbine vane.

Preferably viewing the component while the component is in the machine.

The present invention will be more fully described by way of example and with reference to the accompany drawings, in which.

Figure 1:
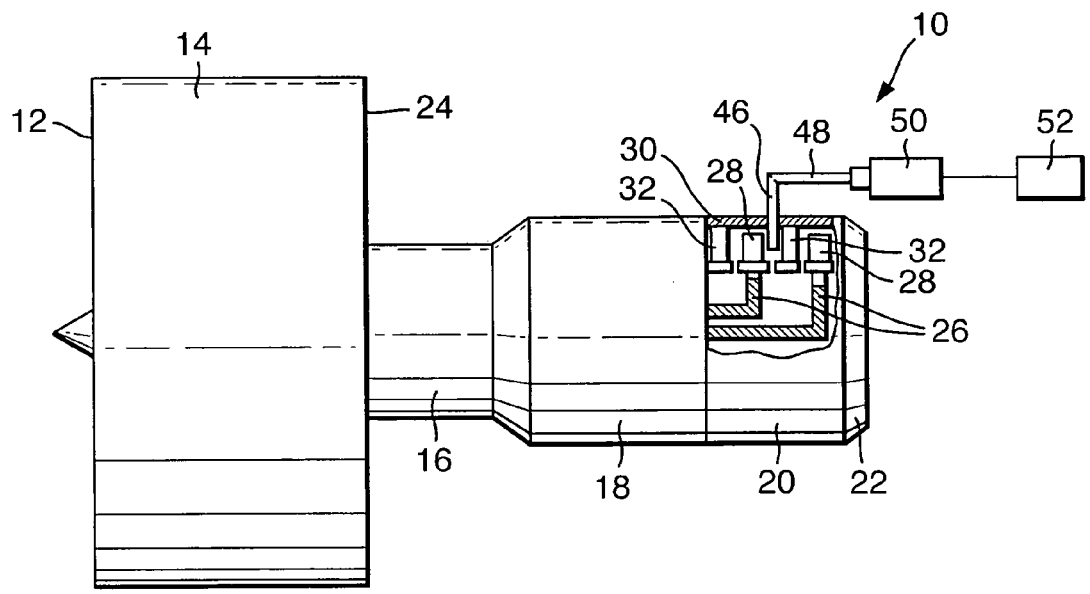
FIG. 1 is a partially cut away view of a turbofan gas turbine engine comprising a turbine blade having a marker paint according to the present invention.

A marker paint according to the present invention is capable of withstanding a temperature up to at least 1100° C. and the marker paint does not substantially change colour when run at maximum operating conditions of a gas turbine engine, or other engine, for 3 minutes.

The marker paint comprises a pigment of cobalt titanium oxide, titanium nickel antimony oxide, cobalt aluminium oxide or cadmium sulphide selenium, a binder and a solvent.

The marker paint broadly comprises 42 wt % to 52 wt % pigment, 31 wt % to 37 wt % acrylic resin and 17 wt % to 21 wt % silicone resin excluding solvent. The solvent comprises a mixture of propylene glycol ethers, for example the solvent comprises a mixture of 80% 1-methoxy-2-propanol and 20% dipropylene glycol monomethyl ether. The amount of solvent used is varied depending upon the particular method of applying the irreversible temperature indicating paint.

The marker paint more narrowly comprises 45 wt % to 49 wt % pigment, 32.5 wt % to 35.5 wt % acrylic resin and 18 wt % to 20 wt % silicone resin excluding solvent.

A particular marker paint comprises 47 wt % pigment, 34 wt % acrylic resin and 19 wt % silicone resin-excluding solvent.

EXAMPLE 1

A green marker paint comprises 47 wt % cobalt titanium oxide ($Co_2TiO_4$), 34 wt % acrylic resin and 19 wt % silicone resin excluding solvent. The acrylic resin comprises polybutyl methacrylate in a solvent, xylene. The silicone resin is a high temperature silicone resin. The solvent comprises a mixture of propylene glycol ethers, for example the solvent comprises a mixture of 80% 1-methoxy-2-propanol and 20% dipropylene glycol monomethyl ether. The green marker paint was produced by mixing 137 g of cobalt titanium oxide ($Co_2TiO_4$), 100 g of acrylic resin, 54 g of silicone resin and 120 g of solvent. The cobalt titanium oxide ($Co_2TiO_4$) is sold under the trade name 34K48 by Johnson Matthey of Liverpool Road East, Kidsgrove, Stoke-on-Trent, ST7 3AA. The acrylic resin is sold under the trade name SYNOCRYL 9122X by Cray Valley Ltd, of Waterloo Works, Machen, Gwent, NP1 8YN Wales. The silicone resin is sold under the trade name DC840 by Dow Corning Europe, of 62 Rue General De Gaulle, 1310 La Hulpe, Brussels, Belgium. The solvent is sold under the trade name BANNERNOL E by Samuel Banner Co Ltd, of 59/61 Sandhills Lane, Liverpool, L5 9XL, England.

EXAMPLE 2

A yellow marker paint comprises 47 wt % titanium nickel antimony oxide ($(Ti, Ni, Sb)O_2$), 34 wt % acrylic resin and 19 wt % silicone resin excluding solvent. The acrylic resin comprises polybutyl methacrylate in a solvent, xylene. The silicone resin is a high temperature silicone resin. The solvent comprises a mixture of propylene glycol ethers, for example the solvent comprises a mixture of 80% 1-methoxy-2-propanol and 20% dipropylene glycol monomethyl ether. The yellow marker paint was produced by mixing 137 g of titanium nickel antimony oxide ($(Ti, Ni, Sb)O_2$), 100 g of acrylic resin, 54 g of silicone resin and 120 g of solvent. The titanium nickel antimony oxide ($(Ti, Ni, Sb)O_2$) is sold under the trade name 34H12 by Johnson Matthey, of Liverpool Road East, Kidsgrove, Stoke-on-Trent, ST7 3AA. The acrylic resin is sold under the trade name SYNOCRYL 9122X by Cray Valley Ltd, of Waterloo Works, Machen, Gwent, NP1 8YN, Wales. The silicone resin is sold under the trade name DC840 by Dow Corning Europe, 62 Rue General De Gaulle, 1310, La Hulpe, Brussels, Belgium. The solvent is sold under the trade name BANNERNOL E by Samuel Banner Co Ltd, of 59/61 Sandhills Lane, Liverpool, L5 9XL, England.

EXAMPLE 3

A blue marker paint comprises 47 wt % cobalt aluminium oxide ($CoAl_2O_4$), 34 wt % acrylic resin and 19 wt % silicone resin excluding solvent. The acrylic resin comprises polybutyl methacrylate in a solvent, xylene. The silicone resin is a high temperature silicone resin. The solvent comprises a mixture of propylene glycol ethers, for example the solvent comprises a mixture of 80% 1-methoxy-2-propanol and 20% dipropylene glycol monomethyl ether. The blue marker paint was produced by mixing 137 g of cobalt aluminium oxide ($CoAl_2O_4$), 100 g of acrylic resin, 54 g of silicone resin and 120 g of solvent. The cobalt aluminium oxide ($CoAl_2O_4$) is sold under the trade name 34L39 by Johnson Matthey. The acrylic resin is sold under the trade name SYNOCRYL 9122X. The silicone resin is sold under the trade name DC840. The solvent is sold under the trade name BANNERNOL E.

EXAMPLE 4

A red marker paint comprises 47 wt % cadmium sulphide selenium (CdS/Se), 34 wt % acrylic resin and 19 wt % silicone resin excluding solvent. The acrylic resin comprises polybutyl methacrylate in a solvent, xylene. The silicone resin is a high temperature silicone resin. The solvent comprises a mixture of propylene glycol ethers, for example the solvent comprises a mixture of 80% 1-methoxy-2-propanol and 20% dipropylene glycol monomethyl ether. The red marker paint was produced by mixing 137 g of cadmium sulphide selenium (CdS/Se), 100 g of acrylic resin, 54 g of silicone resin and 120 g of solvent. The cadmium sulphide selenium (CdS/Se) is sold under the trade name 270944 by Ferro of Nile Street, Burslem, Stoke-on-Trent. The acrylic resin is sold under the trade name SYNOCRYL 9122X. The silicone resin is sold under the trade name DC840. The solvent is sold under the trade name BANNERNOL E.

A turbofan gas turbine engine 10, as shown in FIG. 1, comprises in flow series an intake 12, a fan section 14, a compressor section 16, a combustion section 18, a turbine section 20 and an exhaust 22. The fan section 14 has a fan exhaust 24. The turbine section 20 comprises one or more turbine rotors 26, each of which carries a plurality of radially outwardly extending, equally circumferentially spaced turbine blades 28. The turbine section 20 also comprises a turbine casing 30, which has a number of stages of turbine vanes 32. Each stage of turbine vanes 32 comprises a plurality of equally circumferentially spaced turbine vanes 32 extending radially inwardly from the turbine casing 30.

Figure 2:
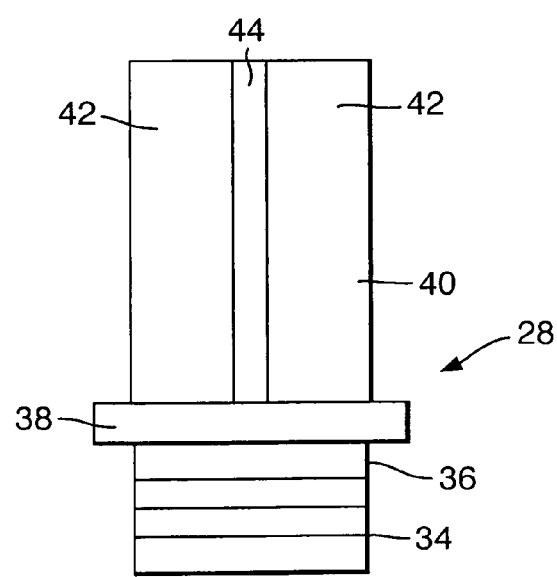
FIG. 2 is an enlarged view of a gas turbine engine turbine blade having a marker paint according to the present invention.

A turbine blade 28, as shown more clearly in FIG. 2, comprises a root 34, a shank 36, a platform 38 and an aerofoil 40. The turbine blade 28 has one or more of the marker paints 44 applied onto regions of the aerofoil 40 or platform 38, by brushing, spraying etc and one or more of the irreversible temperature indicating paints are applied onto regions of the aerofoil 40 or platform 38, by brushing, spraying etc. The irreversible temperature indicating paint and marker paint may be applied to other components of the gas turbine engine, for example the turbine vanes, combustion chambers etc.

The gas turbine engine is run at the gas turbine engines normal operating conditions for about 3 minutes. The irreversible temperature indicating paint(s) 42 change colour at one or more known temperatures. These colour changes of the irreversible temperature indicating paint(s) 42 indicate the temperature to which different parts of a component 28, 32 or components have been subjected. The marker paint(s) 44 do not change colour with temperature.

A boroscope 46, as shown in FIG. 1, is used to obtain an image of the irreversible temperature indicating paint(s) 42 and the marker paint(s) 44 while the components 28, 32 are in the gas turbine engine 10. The use of a boroscope 46 to obtain an image of the irreversible temperature indicating paint(s) 42 enables the irreversible temperature indicating paint(s) 42 and the marker paint(s) 42 to be analysed without removing the components 28, 32 from the gas turbine engine 10.

The components are illuminated by a light source and a digital camera 50, a charge coupled device (CCD) camera, is used to obtain an image of the irreversible temperature indicating paint(s) 42 and the masker paint(s) 44 using the boroscope 46 and possibly a light guide 48, for example a fibre optic cable, to connect, and to carry the image, from the boroscope 46 to the digital camera 50. The digital camera 50 produces an electrical signal, which is supplied to a processor 52, for example a personal computer, computer etc.

As mentioned earlier it is difficult to obtain the right balance of light for illumination of the irreversible temperature indicating paint 42 to achieve a suitable colour balance. Also when the gas turbine engine 10 is run at normal operating conditions debris and/or dirt may be deposited on the irreversible temperature indicating paint 42 masking the colour of the irreversible temperature indicating paint 42. Both these effects make it difficult to analyse the irreversible temperature indicating paint 42 and/or reduce the accuracy of the temperature measurement.

The processor 52 analyses that part of the image corresponding to the marker paint(s) 44 to determine the amount of debris and/or dirt deposited on the marker paint(s) 44 and hence the amount of debris and/or dirt deposited on the irreversible temperature indicating paint(s) 42 and to achieve the right balance of light for illuminating the irreversible temperature indicating paint(s) 42. The processor 52 analyses the colour of that part of the image corresponding to the marker paint(s) 44 by comparing the colour of that part of the image corresponding to the marker paint(s) with a stored colour of the marker paint(s) to determine if there is a difference in colour.

If there is a difference in colour then this is an indication that there is dirt and/or debris on the marker paint(s) 44 and hence there is dirt and/or debris on the irreversible temperature indicating paint(s) 42.

The processor 52 analyses that part of the image corresponding to the irreversible temperature indicating paint(s) 42 and determines the colours of the irreversible temperature indicating paint at different positions. The processor 52 then allocates temperatures to the colours at the different positions from a store of the known colours for that/those particular irreversible temperature indicating paint(s) 42.

The processor 52 then takes into account the fact that there is debris and/or dirt on the irreversible temperature indicating paint(s) 42 and adjusts the temperature allocated to the different positions on the irreversible temperature indicating paint(s) 42. The adjustment may be an increase in temperature or decrease in temperature allocated to the different positions.

Although the present invention has been described with reference to analysing the irreversible temperature indicating paint and the marker paint while the components are on the gas turbine engine it may be possible to remove the components from the gas turbine engine for analysing.

Although the present invention has been described with reference to using a boroscope and processor to analyse the irreversible temperature indicating paint and the marker paint it may be possible to do this manually.

Although the present invention has been described with reference to analysing the irreversible temperature indicating paint and the marker paint on a gas turbine engine component it may be equally possible to analyse irreversible temperature indicating paint on the components of other engines or machines.

What is claimed is:

1. A marker paint comprising a pigment, a binder and a solvent, the pigment comprising cobalt titanium oxide, titanium nickel antimony oxide, cobalt aluminium oxide or cadmium sulphide selenium, wherein
    the marker paint comprises 42wt% to 52wt% pigment and the binder comprises 31wt% to 37wt% acrylic resin and 17wt% to 21wt% silicone resin,
    the marker paint is capable of withstanding temperatures up to at least 1100° C, and
    the marker paint does not change color.

2. A marker paint as claimed in claim 1 comprising 45 wt% to 49 wt% pigment, 32.5 wt% to 35.5 wt% acrylic resin and 18 wt% to 20 wt% silicone resin, excluding solvent.

3. A marker paint as claimed in claim 1 comprising 47 wt% pigment, 34 wt% acrylic resin and 19 wt% silicone resin, excluding solvent.

4. A marker paint as claimed in claim 1, wherein the acrylic resin comprises polybutyl methacrylate.

5. A marker paint as claimed in claim 1 wherein the solvent comprises a mixture of propylene glycol ethers.

6. A marker paint as claimed in claim 5 wherein the solvent comprises a mixture of 80% 1-methoxy-2-propanol and 20% dipropylene glycol monomethyl ether.

7. A marker paint as claimed in claim 1, wherein the marker paint is a green marker paint and the pigment comprises cobalt titanium oxide.

8. A marker paint as claimed in claim 1, wherein the marker paint is a yellow marker paint and the pigment comprises titanium nickel antimony oxide.

9. A paint as claimed in claim 1, wherein the marker paint is a blue marker paint and the pigment comprises cobalt aluminum oxide.

10. A marker paint as claimed in claim 1, wherein the marker paint is a red marker paint and the pigment comprises cadmium sulphide selenium.

* * * * *